METHOD AND MATERIALS FOR PRINTING SMOOTH MAGNETIC LAYERS

Filed March 14, 1968

INVENTOR
PAUL CHEBINIAK

BY Sughrue, Rothwell, Mion & Zinn
ATTORNEYS

United States Patent Office 3,497,411
Patented Feb. 24, 1970

3,497,411
METHOD AND MATERIALS FOR PRINTING SMOOTH MAGNETIC LAYERS

Paul Chebiniak, Johnson City, N.Y., assignor to International Business Machines Corporation, Armonk, N.Y., a corporation of New York Continuation-in-part of application Ser. No. 333,927, Dec. 27, 1963. This application Mar. 14, 1968, Ser. No. 715,472
Int. Cl. B32b *33/06;* C09j *7/02*
U.S. Cl. 156—234 5 Claims

ABSTRACT OF THE DISCLOSURE

A magnetic layer transfer element comprising a carrier substrate, a thin film comprising a lubricating substance coated on the carrier and a magnetic layer coated on the thin film. The invention also includes a method of transferring a magnetic layer by depositing the above-described film onto a smooth surface of a carrier substrate, coating a magnetic layer over said film, placing the magnetic layer in contact with the receiving substrate surface and applying heat and pressure to the carrier to transfer said magnetic layer whereby at least a portion of said film is transferred with said magnetic layer and remains as a lubricating film on the surface of the magnetic layer.

This application is a continuation-in-part application of Ser. No. 333,927, "Method and Materials for Printing Smooth Magnetic Layers" of Paul Chebiniak, filed Dec. 27, 1963, now abandoned. The benefit of the filing date of said parent application is hereby claimed.

BACKGROUND OF INVENTION

The present invention is directed to a method for printing smooth magnetic films or layers. The invention is also directed to new materials for use in printing smooth magnetic layers.

Many business documents are now provided not only with visible information or records, but also with magnetically recorded information. For example, bank ledger cards are now commonly provided with a magnetic stripe on which information is magnetically recorded.

Initially, the magnetic stripes on ledger cards were produced by conventional printing operations using inks containing a magnetic pigmet. However, lithographic, gravure and other common printing processes have not proved to be generally satisfactory for this purpose.

The amount of ink deposited by such methods does not contain sufficient magnetic pigment to give a good signal.

In addition, most of the documents on which it is desired to print magnetic stripes are paper and the surface of paper is characteristically porous and uneven. Under the presurre of the inking devices used in conventional printing operations, the ink is forced into the irregularities of the surface of the paper. This creates a "hill and valley" effect which results in a very uneven output signal. In fact, bits of information are sometimes "lost" during recording due to interruptions in or the unevenness of the magnetic layer produced by such printing methods.

The unevenness of the magnetic printing also causes serious problems of head wear in contact recording.

In an effort to overcome these problems, attempts have been made to produce magnetic stripes on ledges cards and the like by affixing lengths of magnetic tape to the surface of the cards. While this produces a smoother magnetic surface capable of receiving high bit density recording and giving good output signals, the process is inherently very expensive.

Moreover, a serious problem of warping of the cards was encountered due to the different rates of expansion and contraction of the card stock and the magnetic tape substrate in response to different conditions of humidity.

The substantial thickness of the tape also causes a problem when many cards of the same type are grouped in a pack or stack, which is the normal manner in which they are stored and handled in automatic data processing equipment. Due to the localized additional thickness of the tape, an "accordion" effect is created in the pack which makes the cards difficult to handle.

Therefore, it is an object of the present invention to provide a new method and materials for printing magnetic films or layers to produce extremely smoother recording surfaces.

Another object of the invention is to provide a method and materials for printing smooth magnetic films capable of receiving high bit density recording.

A further object of the invention is to provide a method and materials for printing smooth magnetic films which reduce head wear in contact recording.

An additional object of the invention is to provide a method and materials for economically and efficiently applying smooth magnetic layers onto a porous or uneven substrate without danger of subsequent warping of the printed article.

DESCRIPTION OF THE DRAWING

Other highly desirable objects and advantages will become apparent in view of the following detailed description of the invention considered in the light of the accompanying drawing which illustrates a preferred embodiment of the invention.

In the drawing.

BRIEF DESCRIPTION OF THE INVENTION

According to the present invention, smooth magnetic layers are printed onto porous, rough or uneven substrates by transfer from a special carrier substrate. The carrier substrate comprises a sheet, film or web of material having at least one extremely smooth surface. The smooth surface of the carrier substrate is coated with a thin film of a reelase agent. The release agent is then overcoated with a layer of magnetic ink.

The release film is so thin that the surface of the ink layer facing the carrier substrate conforms to the smooth surface of the carrier.

The ink layer is then placed in contact with a receiving substrate, such as a ledger card, and the assembly is subjected to heat and pressure to transfer the ink layer from the carrier substrate. The release film is a material which permits parting of the ink layer and the carrier under the influence of heat and pressure.

Therefore, the surface of the ink layer formerly in contact with the smooth surface of the carrier becomes the outer surface of the magnetic layer. Magnetic layers produced in this manner have been found to possess signficantly superior read-write characteristics. They are capable of receiving high bit-density recordings and produce strong out-put signals. Due to the smooth surface of the layers, head wear is also reduced and noise effects are minimized.

DETAILED DESCRIPTION OF THE INVENTION

In the preferred embodiment of the invention, an adhesive coating is placed over the magnetic layer to improve transfer and adhesion to the receiving substrate. The adhesive may be a material which is heat activated so that it becomes effective in response to the application of heat and pressure during the transfer step.

Although the release layer is an extremely thin film, a small amount of this substance is transferred with the magnetic layer and remains on the surface of the magnetic layer. Another embodiment of the present invention comprises the incorporation in the release layer of a small amount of a lubricating substance. The presence of the lubricating substance on the smooth outer surface of the magnetic layer further reduces head wear problems.

Figure 1:
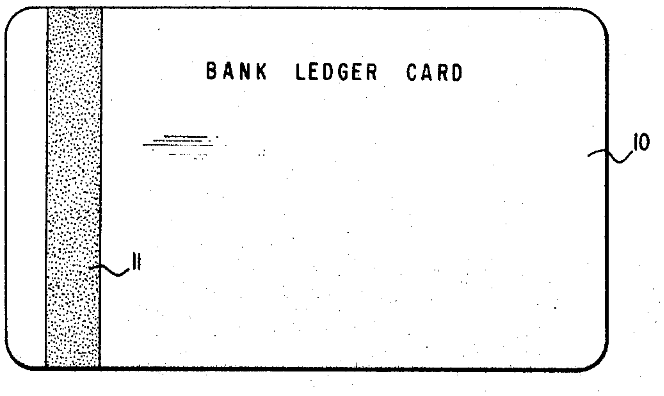
FIGURE 1 is a plan view of a bank ledger card, a typical article made according to the present invention.

Considering the invention more in detail and referring to FIGURE 1 of the drawing, there is illustrated the type of article which the present invention is especially well suited to produce. The bank ledger card 10 is normally a heavy paper or card stock which may be imprinted on one or both sides with a visual record of bank transactions. Near one edge of the card, a stripe of magnetic material 11 is provided on which is recorded magnetically additional information or perhaps the same information as is contained in the printed visual entries.

Figure 2:
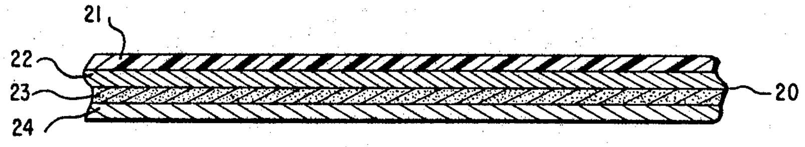
FIGURE 2 is a cross-sectional edge view of the material used to apply magnetic layers according to the invention.

According to the present invention, and referring now to FIG. 2, magnetic stripes of the type illustrated in FIGURE 1 are produced by use of special transfer elements 20. In the preferred embodiment, element 20 comprises a carrier substrate 21, the coated surface of which is essentially very smooth.

Coated on the smooth surface of carrier substrate 21 is a thin film 22 of a release agent. The release agent preferably is a material which becomes softened or molten when heated so as to permit relatively easy parting between the carrier substrate and layers applied over the release film 22.

A layer 23 containing magnetic pigment is then applid over the release film 22. Layer 23 is substantially thicker than the films of magnetic ink which can be deposited by ordinary printing methods. Due to the thickness of magnetic layer 23 and because it remains in a solid or semi-solid state, as opposed to the relatively liquid condition necessary in the usual printing ink, a much higher density of magnetic pigment is deposited. For this same reason, the transferred layer resists the "hill and valley" effect which reduces the value of conventional printed films when applied to the rough or porous surface of the substrate.

In the preferred embodiment, a heat activated adhesive layer 24 is then applied over pigmented layer 23.

When it is desired to print smooth magnetic layers with elements 20, such an element is placed over the portion of the receiving substrate to be printed. Heat and pressure are then applied to the assembly to transfer the magnetic layer.

Figure 3:
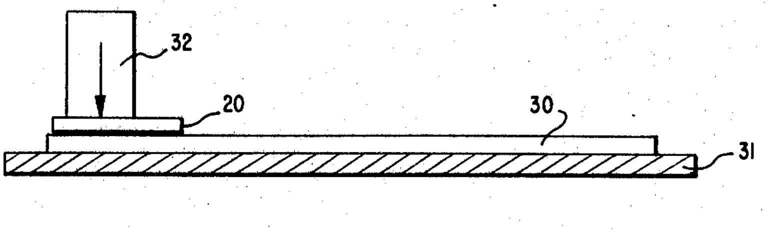
FIGURE 3 is a schematic representation of a system for applying magnetic layers according to the invention.

Referring now to FIGURE 3, the transfer is ordinarily accomplished by placing receiving substrate 30 on a support or platen 31. The transfer element 20 is then placed over the receiving substrate 30 with the carrier substrate 21 facing up and the magnetic layer 23 or adhesive layer 24, where such a layer is used, in contact with the receiving substrate. A heated die 32 is then pressed against element 20 to furnish the necessary heat and pressure to effect transfer of the magnetic layer to the receiving substrate.

As previously noted, some of the release agent is transferred with the magnetic layer and remains as a film on the surface of the magnetic layer. A substantial reduction in head and film wear can be achieved by incorporating a lubricating substance in the release layer. For example, certain silicon materials, such as methyl and phenyl polysiloxanes, may be added to the release layer. Other examples of lubricating substances are: silicon oils; fatty oils such as coco, tallow, marine, soya, cottonseed, castor, palm and oiticica oils; glyceryl stearate, glyceryl butylstearate; ethoxylated fatty acids such as ethoxylated lauric, stearic and tall oil acids; fatty alcohols having between 8 and 22 carbon atoms such as capric, lauric, palmitic, stearic and behenic alcohols; quaternary ammonium derivatives of fatty acids such as Armid, Aromeens and Duomeens and synthetic polymeric materials such as Teflon (polytetrafluoroethylene), polyethylene and halogenated fluorocarbon resin emulsions.

In producing printing elements 20 of the type shown in FIGURE 2, carrier substrate 21 may be any flexible sheet material having at least one very smooth surface. Smooth plastic sheets of Mylar, polyethylene, cellulose acetate and the like are satisfactory.

Any heat sensitive release agent may be used to form film 22. For example, natural waxes, such as carnauba wax, beeswax, paraffin wax or synthetic waxes, such as polyethylene waxes, fluorocarbon waxes and petroleum derivative waxes of suitable melting point may be used. It is desirable that the film of release agent be extremely thin, preferably on a mono-molecular order of thickness so that the surface of the magnetic layer coated over the release layer conforms to the smoothness of the carrier substrate.

The magnetic layer 23 may comprise a vehicle and relatively high percent by weight of magnetic pigment. Other dyes and toners may also be included. Suitable vehicles for the magnetic layer include, for example, nitrocellulose, polyethylene, polypropylene, polyvinylidene chloride, cellulose acetate or any other conventional binder. Any magnetic pigment, such as magnetic iron oxide may be employed in this layer.

The amount of magnetic material carried in layer 23 is much higher than can conveniently be included in inks to be printed by other methods. Since other inks must be relatively less viscous, settling or precipitation of the magnetic pigment would take place rapidly, if such large amounts of pigments were incorporated in the ink. Thus, amounts of pigment of around 40% and higher may be incorporated in the magnetic layer 23 of element 20. The thickness of the magnetic layer 23 may also be on the order of 0.5 mil which is much thicker by far than films printed by conventional methods.

Any conventional heat sensitive adhesive composition may be used to form film 24 where such a film is employed. For example, shellac esters, polyvinylidene chloride compositions, and the like may be employed.

The nature of the invention will be better understood in the light of the following examples:

EXAMPLE 1

On a smooth surface of 0.5-mil thick Mylar substrate, there is coated a very thin layer of petroleum wax. The wax is deposited from a 5% solution in toluene.

Next a magnetic layer of the following composition is applied over the petroleum wax layer:

| | Parts |
|---|---|
| Magnetic iron oxide | 40 |
| Shellac ester | 12 |
| Castor oil | 6 |
| Nitrocellulose (0.5 sec.) | 8 |
| Ethanol | 67 |

The ingredients are milled on a 3-roll mill to obtain thorough mixing and the composition is then coated onto the wax layer as a wet film about two mils thick. After evaporation of the ethanol, the dried film about two mils thick. After evaporation of the ethanol, the dried film is about one mil thick.

This element is then placed over a bank ledger card with the magnetic layer in contact with the card and is subjected to from 40 lbs. to 60 lbs./sq. in. pressure for about 0.5 second at a temperature of 275° F. A smooth magnetic layer is transferred to the card.

EXAMPLE 2

The procedure of Example 1 is repeated, but in addition, a layer of a thermosensitive adhesive of the following composition is applied over the magnetic layer:

| | Parts |
|---|---|
| Nitrocellulose (0.5 sec.) | 8 |
| Shellac ester | 12 |
| Castor oil | 6 |
| Ethanol | 67 |

The adhesive layer is dried by evaporation of the ethanol. Printing is then accomplished as in Example 1.

EXAMPLE 3

The procedure of Example 2 is repeated, but 5% by weight of a polysiloxane lubricant is incorporated in the petroleum wax release layer.

The fact that the magnetic layers printed according to the present invention are much smoother and are suited to high density recording is readily shown by subjecting the products to read-write testing. The products are then compared with magnetic materials produced by other printing methods. The results clearly show that the layers printed by this invention are smoother because they give a signal having much more uniform peaks, and are more dense because they give stronger signals.

What is claimed is:

1. A method for printing smooth magnetic layers onto porous or uneven paper stock receiving substrates, or the like, comprising sequentially:

depositing a thin film onto a smooth surface of a flexible carrier substrate, said film comprising a lubricating substance and a natural or synthetic wax release agent, drying said film to a non-liquid state, coating over said film with a magnetic layer comprising a magnetic iron oxide pigment dispersed in a binder, comprising shellac ester, castor oil, 0.5 sec. nitrocellulose and ethanol, drying said magnetic layer to a non-liquid state, placing said magnetic layer in contact with the surface of a porous or uneven receiving substrate which is to be printed, and applying heat and pressure to said carrier substrate to transfer said magnetic layer to said porous or uneven receiving substrate, whereby at least a portion of said film is transferred with said magnetic layer and remains as a lubricant on the surface of said magnetic layer.

2. A method for printing smooth magnetic layers onto porous or uneven paper stock receiving substrates or the like comprising sequentially:

depositing a thin film onto a smooth surface of a flexible carrier substrate, said film comprising a lubricating substance and a natural or synthetic wax release agent, drying said film to a non-liquid state, coating over said thin film with a magnetic layer comprising a magnetic pigment dispersed in a binder, drying said magnetic layer to a non-liquid state, coating over said magnetic layer a film of a thermosensitive adhesive, drying said thermosensitive adhesive film to a non-liquid state, placing said film of thermosensitive adhesive in contact with the surface of a porous or uneven substrate which is to be printed, and applying heat and pressure to said carrier substrate to activate said thermosensitive adhesive and to transfer said magnetic layer to said porous or uneven receiving substrate, whereby at least a portion of said first film is transferred with said magnetic layer and remains as a lubricating film on the surface of said magnetic layer.

3. An article for transferring smooth, high-density magnetic layers onto a porous or uneven paper stock receiving substrate or the like comprising:

a flexible carrier substrate having a smooth surface, a thin film on the smooth surface of said carrier substrate, said film comprising a lubricating substance and a natural or synthetic wax release agent, a non-liquid magnetic layer on said film, said magnetic layer comprising a magnetic iron oxide pigment dispersed in a binder, comprising shellac ester, castor oil, 0.5 sec. nitrocellulose and ethanol, the amount of said magnetic iron oxide pigment in said magnetic layer being on the order of 40% by weight or higher, and a film of thermosensitive adhesive on said magnetic layer.

4. The article of claim 3 wherein said magnetic layer has a thickness on the order of 0.5 mil.

5. The article of claim 3 wherein said lubricating substance is a silicon material.

References Cited

UNITED STATES PATENTS

| | | | |
|---|---|---|---|
| 2,628,929 | 2/1953 | Persoon et al. | 156—240 |
| 3,013,917 | 12/1961 | Karlan et al. | 156—240 |
| 3,211,603 | 10/1965 | Kaehler | 156—240 |

FOREIGN PATENTS

| | | |
|---|---|---|
| 618,985 | 12/1962 | Belgium. |
| 979,528 | 1/1965 | Great Britain. |

OTHER REFERENCES

Magnetic Tape Recording, H. G. M. Spratt, London, Heywood & Co. Limited, 1958, p. 117, found in Scientific Library, TK5981575.

European Technical Digests, No. 3, March 1961, E.T.D. #4258 (German), p. 18, found in Scientific Library.

ROBERT F. BURNETT, Primary Examiner

RAYMOND O. LINKER, Assistant Examiner

U.S. Cl. X.R.

117—3.2; 156—239, 289; 161—167, 406